United States Patent [19]
Guttmann et al.

[11] Patent Number: 6,105,104
[45] Date of Patent: Aug. 15, 2000

[54] METHOD AND APPARATUS FOR OPTIMIZING THE DATA TRANSFER RATE TO AND FROM A PLURALITY OF DISK SURFACES

[75] Inventors: James Edward Guttmann; Mark David Heminger; Michael Scott Hicken; Steven M. Howe; Timothy Swatosh, all of Rochester, Minn.

[73] Assignee: Western Digital Corporation, Irvine, Calif.

[21] Appl. No.: 08/953,810

[22] Filed: Oct. 20, 1997

[51] Int. Cl.⁷ ................................... G06F 12/00
[52] U.S. Cl. .................. 711/4; 711/112; 360/78.08; 360/61
[58] Field of Search ............... 711/4, 111, 112, 711/114; 369/30, 33; 360/78.04, 78.08, 61, 63

[56] References Cited

U.S. PATENT DOCUMENTS 5,223,993  6/1993  Squires et al. ............... 360/77.08

*Primary Examiner*—Eddie P. Chan
*Assistant Examiner*—Kevin Verbrugge
*Attorney, Agent, or Firm*—Milad G. Shara

[57] ABSTRACT

A method of mapping sequential logical data blocks to multiple disk surfaces. Data blocks are written to a predetermined number of adjacent tracks on each surface before performing a head switch to write data on another surface. The predetermined number of tracks are written on each surface in turn before performing a seek and head switch to continue writing on another predetermined number of tracks on each surface. After each head switch to continue writing from the radial position reached when writing the previous group of tracks, the direction of track incrementing or decrementing reverses so that the actuator moves back and forth in a "serpentine" manner.

13 Claims, 12 Drawing Sheets

X = INDEX
* = HEAD SWITCH
** = SEEK + HEAD SWITCH

X = INDEX
* = SEEK
** = HEAD SWITCH
*** = SEEK + HEAD SWITCH

| CLUST | PART | LOGHD | CYL | LOGICAL SECTOR NUMBER 801 | | | | | | | | | |
|---|---|---|---|---|---|---|---|---|---|---|---|---|---|
| 0 | 0 | 0 | 4 | 0 | 1 | 2 | 3 | 4 | 5 | 6 | 7 | 8 | 9 |
| | | | 5 | 10 | 11 | 12 | 13 | 14 | 15 | 16 | 17 | 18 | 19 |
| | | | 6 | 20 | 21 | 22 | 23 | 24 | 25 | 26 | 27 | 28 | 29 |
| | | | 7 | 30 | 31 | 32 | 33 | 34 | 35 | 36 | 37 | 38 | 39 |
| | | | 8 | 40 | 41 | 42 | 43 | 44 | 45 | 46 | 47 | 48 | 49 |
| | | 1 | 8 | 50 | 51 | 52 | 53 | 54 | 55 | 56 | 57 | 58 | 59 |
| | | | 7 | 60 | 61 | 62 | 63 | 64 | 65 | 66 | 67 | 68 | 69 |
| | | | 6 | 70 | 71 | 72 | 73 | 74 | 75 | 76 | 77 | 78 | 79 |
| | | | 5 | 80 | 81 | 82 | 83 | 84 | 85 | 86 | 87 | 88 | 89 |
| | | | 4 | 90 | 91 | 92 | 93 | 94 | 95 | 96 | S | S | S |
| | 1 | 2 | 4 | 97 | 98 | 99 | 100 | 101 | 102 | 103 | 104 | 105 | 106 |
| | | | 5 | 107 | 108 | 109 | 110 | 111 | 112 | 113 | 114 | 115 | 116 |
| | | | 6 | 117 | 118 | 119 | 120 | 121 | 122 | 123 | 124 | 125 | 126 |
| | | | 7 | 127 | 128 | 129 | 130 | 131 | 132 | 133 | 134 | 135 | 136 |
| | | | 8 | 137 | 138 | 139 | 140 | 141 | 142 | 143 | 144 | 145 | 146 |
| | | 3 | 8 | 147 | 148 | 149 | 150 | 151 | 152 | 153 | 154 | 155 | 156 |
| | | | 7 | 157 | 158 | 159 | 160 | 161 | 162 | 163 | 164 | 165 | 166 |
| | | | 6 | 167 | 168 | 169 | 170 | 171 | 172 | 173 | 174 | 175 | 176 |
| | | | 5 | 177 | 178 | 179 | 180 | 181 | 182 | 183 | 184 | 185 | 186 |
| | | | 4 | 187 | 188 | 189 | 190 | 191 | 192 | 193 | S | S | S |
| | 2 | 0 | 9 | 194 | 195 | 196 | 197 | 198 | 199 | 200 | 201 | 202 | 203 |
| | | | 10 | 204 | 205 | 206 | 207 | 208 | 209 | 210 | 211 | 212 | 213 |
| | | | 11 | 214 | 215 | 216 | 217 | 218 | 219 | 220 | 221 | 222 | 223 |
| | | | 12 | 224 | 225 | 226 | 227 | 228 | 229 | 230 | 231 | 232 | 233 |
| | | | 13 | 234 | 235 | 236 | 237 | 238 | 239 | 240 | 241 | 242 | 243 |
| | | 1 | 13 | 244 | 245 | 246 | 247 | 248 | 249 | 250 | 251 | 252 | 253 |
| 1 | | | 12 | 254 | 255 | 256 | 257 | 258 | 259 | 260 | 261 | 262 | 263 |

FIG. 8

| CLUST | PART | LOG HD | CYL | LOGICAL SECTOR NUMBER | | | | | | | | | |
|---|---|---|---|---|---|---|---|---|---|---|---|---|---|
| | | | | 0 | 1 | 2 | 3 | 4 | 5 | 6 | 7 | 8 | 9 |
| 0 | 0 | 0 | 4 | 0 | 1 | 2 | 3 | 4 | 5 | 6 | 7 | 8 | 9 |
| | | | 5 | 10 | 11 | 12 | 13 | 14 | 15 | 16 | 17 | 18 | 19 |
| | | | 6 | 20 | D | 21 | 22 | 23 | 24 | 25 | 26 | 27 | 28 |
| | | | 7 | 29 | 30 | 31 | 32 | 33 | 34 | 35 | 36 | 37 | 38 |
| | | | 8 | 39 | 40 | 41 | 42 | 43 | 44 | 45 | 46 | 47 | 48 |
| | | 1 | 8 | 49 | 50 | 51 | 52 | 53 | 54 | 55 | D | 56 | 57 |
| | | | 7 | 58 | 59 | 60 | 61 | 62 | 63 | 64 | 65 | 66 | 67 |
| | | | 6 | X | X | X | X | X | X | X | X | X | X |
| | | | 5 | 68 | 69 | 70 | 71 | 72 | 73 | 74 | 75 | 76 | 77 |
| | | | 4 | 78 | 79 | 80 | 81 | 82 | 83 | 84 | S | S | S |
| | 1 | 2 | 4 | 85 | 86 | 87 | 88 | 89 | 90 | 91 | 92 | 93 | 94 |
| | | | 5 | 95 | 96 | 97 | 98 | 99 | 100 | 101 | 102 | 103 | 104 |
| | | | 6 | 105 | 106 | 107 | 108 | 109 | 110 | 111 | 112 | 113 | 114 |
| | | | 7 | D | D | 115 | 116 | 117 | 118 | 119 | 120 | 121 | 122 |
| | | | 8 | 123 | 124 | 125 | 126 | 127 | 128 | 129 | 130 | 131 | 132 |
| | | 3 | 8 | 133 | 134 | 135 | 136 | 137 | 138 | 139 | 140 | 141 | 142 |
| | | | 7 | X | X | X | X | X | X | X | X | X | X |
| | | | 6 | 143 | 144 | 145 | 146 | 147 | 148 | 149 | 150 | 151 | 152 |
| | | | 5 | 153 | 154 | 155 | 156 | 157 | 158 | 159 | 160 | 161 | 162 |
| | | | 4 | 163 | 164 | 165 | 166 | 167 | 168 | 169 | 170 | 171 | 172 |
| 1 | 2 | 0 | 9 | 173 | 174 | 175 | 176 | 177 | 178 | 179 | 180 | 181 | 182 |
| | | | 10 | 183 | 184 | D | 185 | 186 | 187 | 188 | 189 | 190 | 191 |
| | | | 11 | 192 | 193 | 194 | 195 | 196 | 197 | 198 | 199 | 200 | 201 |
| | | | 12 | 202 | 203 | 204 | 205 | 206 | 207 | 208 | 209 | 210 | 211 |
| | | | 13 | 212 | 213 | 214 | 215 | 216 | 217 | 218 | 219 | 220 | 221 |
| | | 1 | 13 | 222 | 223 | 224 | 225 | 226 | D | 227 | 228 | 229 | 230 |
| | | | 12 | 231 | 232 | 233 | 234 | 235 | 236 | 237 | 238 | 239 | 240 |

FIG. 9

| CLUSTER | CYL | LOGICAL (PHYSICAL) HEAD | | | |
|---|---|---|---|---|---|
| | | 0 (0) | 1 (2) | 2 (3) | 3 (1) |
| 0 | 4 | 0 | 9 | 10 | 19 |
| | 5 | 1 | *8* | 11 | 18 |
| | 6 | *2* | 7 | 12 | *17* |
| | 7 | 3 | 6 | 13 | *16* |
| | 8 | 4 | 5 | *14* | 15 |
| 1 | 9 | 20 | 29 | 30 | *39* |
| | 10 | 21 | *28* | *31* | 38 |
| | 11 | 22 | 27 | 32 | 37 |
| | 12 | *23* | 26 | 33 | 36 |
| | 13 | *24* | 25 | 34 | 35 |

TRACK LAYOUT WITH DEFECTS

FIG. 11

| INDEX | CYL | PHYS HD | LOG HD |
|---|---|---|---|
| 0 | 5 | 2 | 1 |
| 1 | 6 | 0 | 0 |
| 2 | 6 | 1 | 3 |
| 3 | 7 | 1 | 3 |
| 4 | 8 | 3 | 2 |
| 5 | 9 | 1 | 3 |
| 6 | 10 | 2 | 1 |
| 7 | 10 | 3 | 2 |
| 8 | 12 | 0 | 0 |
| 9 | 13 | 0 | 0 |

SORTED BY
ASCENDING CYLINDER
ORDER

FIG. 12

| INDEX | CYL | PHYS HD | LOG HD |
|---|---|---|---|
| 0 | 6 | 0 | 0 |
| 1 | 5 | 2 | 1 |
| 2 | 8 | 3 | 2 |
| 3 | 6 | 1 | 3 |
| 4 | 7 | 1 | 3 |
| 5 | 12 | 0 | 0 |
| 6 | 13 | 0 | 0 |
| 7 | 10 | 2 | 1 |
| 8 | 10 | 3 | 2 |
| 9 | 9 | 1 | 3 |

ASCENDING LOGICAL
HEAD ORDER BY
CLUSTER

FIG. 13

| INDEX | CYL | PHYS HD | LOG HD |
|---|---|---|---|
| 0 | 6 | 0 | 0 |
| 1 | 5 | 2 | 1 |
| 2 | 8 | 3 | 2 |
| 3 | 7 | 1 | 3 |
| 4 | 6 | 1 | 3 |
| 5 | 12 | 0 | 0 |
| 6 | 13 | 0 | 0 |
| 7 | 10 | 2 | 1 |
| 8 | 10 | 3 | 2 |
| 9 | 9 | 1 | 3 |

ASCENDING LOGICAL
HEAD ORDER WITH
REVERSED ORDER FOR
ODD # LOGICAL HEADS

FIG. 14

METHOD AND APPARATUS FOR OPTIMIZING THE DATA TRANSFER RATE TO AND FROM A PLURALITY OF DISK SURFACES

FIELD OF THE INVENTION

This invention relates to a disk drive and in particular to a method for mapping sequential logical data blocks to the recording surfaces of the disk drive to achieve an efficient transfer of data between the disk drive and a host computer.

BACKGROUND OF THE INVENTION

An intelligent disk drive records and reproduces data on concentric tracks located on each of a plurality of disk surfaces. A transducer head mounted on an actuator arm is moved over a rapidly spinning disk to a position over one of the tracks and transfers data when a targeted data block location is under the head. Each track has a plurality of data sectors, generally corresponding to data blocks, dispersed around the track. In a preferred configuration, the track also has servo sectors dispersed at regular intervals around the track to provide for sampled signal servo control of the transducer head position. The regular intervals of servo sectors when viewed on the disk surface form "wedges" or divided segments of the track with the data sectors disposed between servo sectors.

Conventionally the data sectors are numbered in sequential order from a reference point called the index. The index for a given disk surface is frequently designated by a special servo sector. The sequentially numbered data sectors are known as "physical sectors."

When viewed by a host computer, the intelligent disk drive is frequently treated as a storage device for a large linear string of arbitrarily sized "blocks" of data. Conventionally a data block is 512 bytes in length and, because the host computer need not be aware of the actual physical layout of the drive, the data blocks are termed "logical data blocks." In transactions over a commonly employed interface such as the SCSI protocol, the host and disk drive transfer data to one another in logical data block units. The means for referencing a given logical data block is its sequential address in the string known as a "logical block address" or LBA.

Within the disk drive logical blocks are recorded in the data sectors. A disk drive control microprocessor determines a plan for placing or "mapping" the logical blocks onto specific tracks and data sectors on the disk surfaces. When the host retrieves a logical data block, the disk drive consults the plan to retrieve the data from a specific physical location i.e. surface/track/sector.

The host computer usually requests data transfers in groups of blocks having sequential LBA's rather than single blocks. When large groups of blocks are transferred, the transfer is generally termed "sequential." When many small groups of data blocks are transferred where the groups are non-sequential, the transfer is generally termed "random." The mapping of logical data blocks on the disk surface can greatly impact the measured performance of the drive, therefore great care is taken to optimize the mapping to account for mechanical and electronic delays in accessing data.

Mechanical delays include the time required to move the actuator arm to a specific track or "cylinder" known as a "seek" delay. The other primary mechanical delay is the (average) time required for a sector to pass under the head once the head is positioned over a track. This is termed a "rotational" delay governed by the disk spin rate.

When the data is located on a different surface than that presently being accessed, a "head switch" must be performed to select a new head associated with the surface and to allow the electronic channel to adapt to the gain requirements of the new head and to allow the head to settle on the track. Thus when considering the time required to access data from a given reference point, the seek, rotational, and head switch delays are key performance determinants.

FIG. 1 is a partial cross sectional view of a prior art disk drive 100 having two disks 200 mounted on spindle 110 and corresponding surfaces 202,204,206, and 208. Data tracks 250 are disposed on the surfaces. Conventionally, a large array of sequential blocks may be written to the data tracks by writing to track 250a until all sectors have been written. A head switch to surface 204 is then performed as indicated by dashed line 310, and data continues to be written to track 250b, directly underlying track 250a. When track 250b is filled, a head switch to surface 206 and track 250c is performed as indicated by dashed line 315. Track 250c is filled, then a head switch to surface 208 and track 250d is performed, indicated by dashed line 320. Tracks 250a, 250b, 250c, and 250d form a "cluster" in that they represent a set of tracks in which consecutive logical data blocks are written. When track 250d is filled, a combination seek to track 250e and head switch to surface 202, indicated by the dash-dot line 325, is performed in order to continue the sequential writing process. In this manner sequential logical data blocks are mapped to the surfaces by writing to each track of the cluster in order before proceeding to the next track. The mapping convention was chosen because the delay required for a head switch in the prior art is significantly less than that required to perform a single track seek, thereby maximizing performance.

In current disk drives, the need to store vastly increasing amounts of data has caused data tracks on the disk surfaces to be significantly more closely spaced than in the prior art, thereby reducing the mechanical delay to seek between adjacent tracks. Newer heads, the electronics channel, and the methods of recording data have increased in complexity which, in combination with the more closely spaced tracks, has effectively reversed the traditional ratio between time required for a head switch and time required to perform a single track seek. The combined effect is to create a need for an improved sequential data block mapping scheme which takes into account the reversed ratio.

SUMMARY OF THE INVENTION

The invention can be viewed as a method of operating a disk drive having a controllable head stack assembly including a plurality of heads and having a plurality of disk surfaces, each disk surface having a plurality of tracks. The method causes the transfer of a sequence of logical data blocks between the tracks and the heads in a multiple step operation including causing the head stack assembly to perform a sequence of alternating track seeks and head switches in which each head switch is preceded by a track seek so that one head at a time defines a respective part of a serpentine accessing path defined over a selected group of the tracks. During the multiple step operation, the method transfers the logical data blocks between the heads and the selected group of tracks.

In another aspect, the invention can be described as a method of mapping sequential logical data blocks to a plurality of disk surfaces. The method comprises selecting a multidimensional cluster having horizontal and vertical extents and comprising a plurality of logical surface clusters. Each logical surface cluster further comprises a plurality of adjacent tracks on a respective one of the plurality of disk surfaces. In a next step, the method comprises selecting a first one of the plurality of logical surface clusters. The next step is to write sequential logical data blocks to each track of the selected first one of the plurality of logical surface clusters. Next a second one of the plurality of logical surface clusters is selected. Then sequential logical data blocks are written to each track of the selected second one of the plurality of logical surface clusters. The sequential logical data blocks written to the second logical surface cluster are contiguous with the sequential logical data blocks written to the first logical surface cluster.

Preferably, each track is assigned a cylinder number corresponding to a cylinder position and the plurality of tracks is arranged by cylinder number order.

Preferably, the sequential logical data blocks are written to the first and second logical surface clusters by cylinder number order. The cylinder number order may be ascending or descending.

In another view, the invention is a disk drive having a controllable head stack assembly including plurality of heads and having a plurality of disk surfaces, each disk surface having a plurality of tracks. The disk drive further provides means for causing the transfer of a sequence of logical data blocks between the tracks and heads; means for a multiple step operation to cause the head stack assembly to perform a sequence of alternating track seeks and head switches in which each head switch is preceded by a track seek so that one head at a time defines a respective part of a serpentine accessing path defined over a selected group of the tracks; and means for transferring the logical data blocks between the heads and the selected group of tracks during the multiple step operation.

BRIEF DESCRIPTION OF THE DRAWINGS

FIG. 8 is a table showing the partitioning and mapping of logical blocks in a disk drive with the invention without consideration of surface defects.

FIG. 9 is a table showing the partitioning and mapping of logical blocks in a disk drive with the invention and including the effect of surface defects.

FIG. 11 is a table illustrating an example track layout with two multi-dimensional clusters, and highlighting exemplary defective sectors for use as a basis for a defect list to be provided to a host computer.

FIG. 12 is a table showing a first step in providing a defect list indexed in the order in which defective sectors will be encountered in a disk drive having logical sectors and data blocks mapped according to the invention. The list of FIG. 12 is ordered by ascending cylinder number.

FIG. 13 is a table showing the next step in the process of creating an ordered defect list where the list of FIG. 12 is reordered by ascending logical head number in logical surface clusters.

FIG. 14 is a table showing the final step in creating the ordered defect list where the alternating incrementing/decrementing of track numbers by logical surface cluster is taken into account.

DETAILED DESCRIPTION

Figure 15:
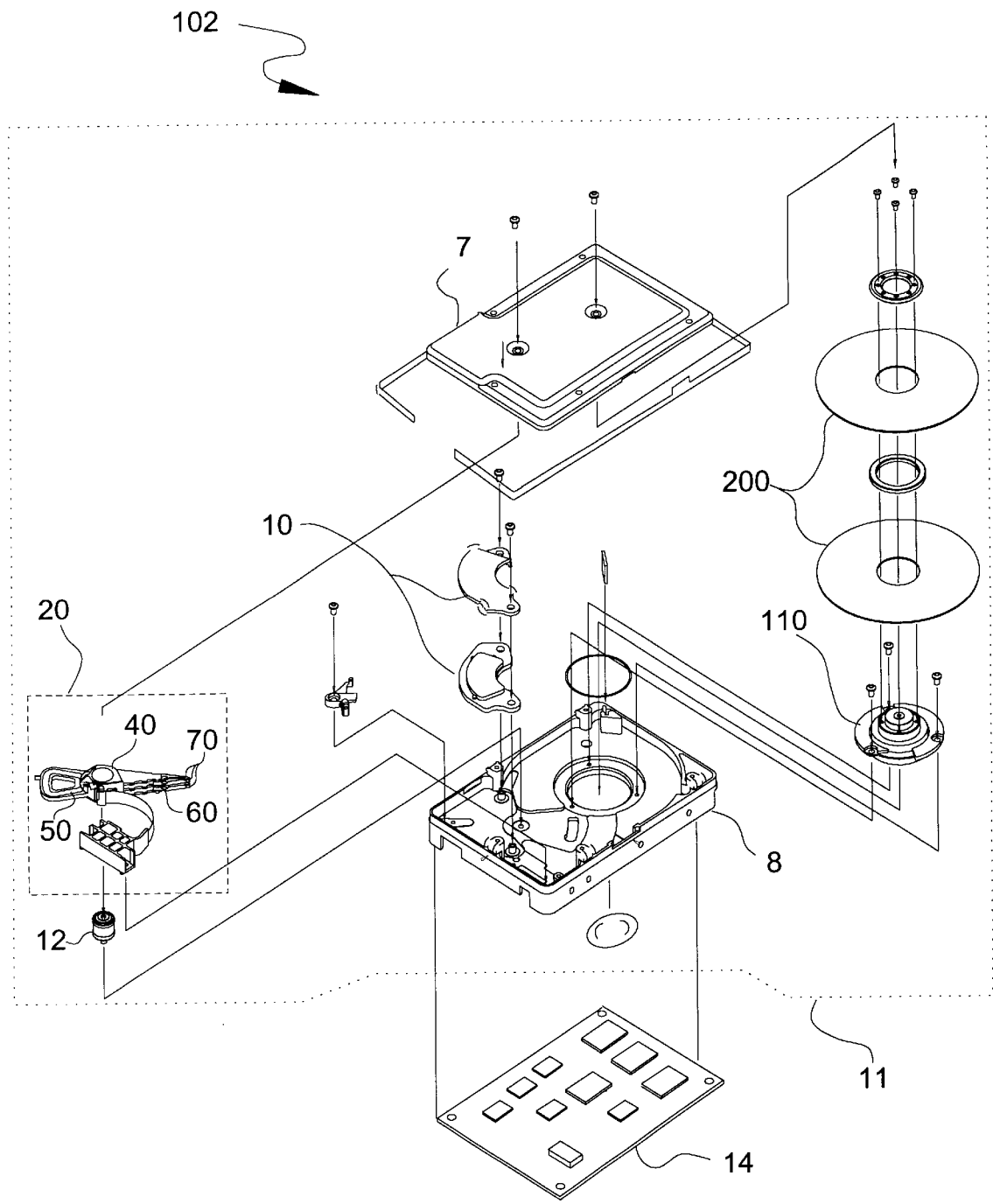
FIG. 15 is an exploded of a view of a disk drive 102 providing means for using the invention to transfer logical data blocks between the heads and the tracks.

FIG. 15 shows an exploded view of a disk drive 102 having means for practicing the invention. A plurality of disks 200 (2 shown) provide for the recording and reproduction of logical data blocks on concentric tracks disposed on their surfaces. The disks 200 are rotated on a spindle motor 110 which is supported by base 8. A head stack assembly 20 comprises a coil 50, a body portion 40, a plurality of arms 60, and a transducer head 70 disposed on each arm 60. The head stack assembly is supported on pivot bearing cartridge 12 mounted to base 8 to pivot heads 60 over disks 200 during data transfer operations. One or more magnets permanent magnets 10 when combined with coil 60 form a rotary actuator motor to control the position of heads 60 over disks 200. Cover 7 in combination with base 8 forms an enclosed chamber to house head stack assembly 20, disks 200, spindle motor 110 and magnets 10. The combination of enclosed disk components is termed a Head Disk Assembly (HDA) 11.

A controller 14 provides electronic circuitry and microprocessor components to effect control of HDA 11 components and transfer data between a host computer (not shown) and disks 200 via heads 60.

Figure 1:
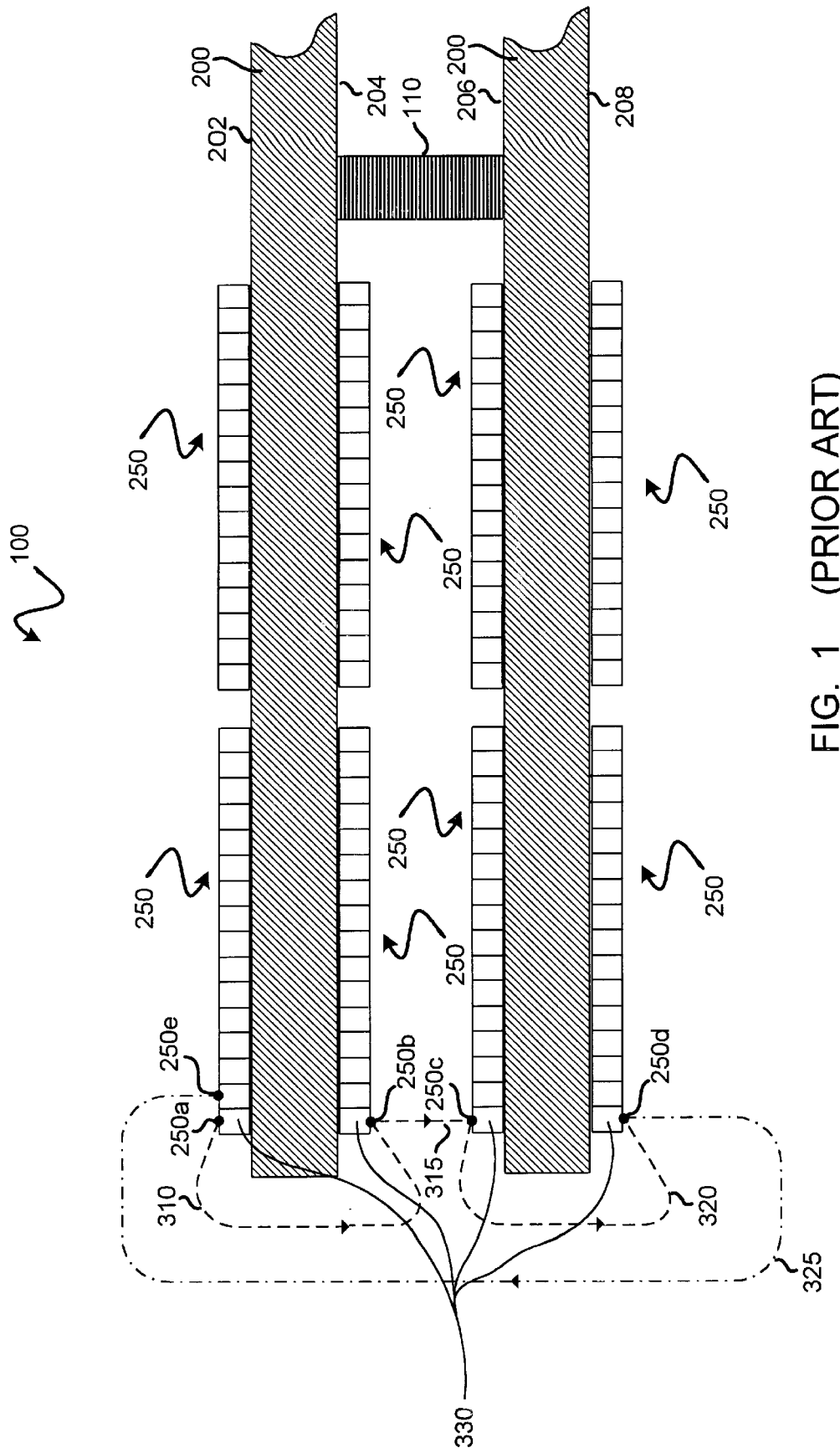
FIG. 1 shows a cross sectional view of a portion of a prior art disk drive 100 having a plurality of surfaces and data tracks and the path taken to record sequential data blocks in a "vertical cluster."

FIG. 1 shows a cross section of a portion of prior art disk drive 100 having two disks 200 rotated on spindle 110. Disk surfaces 202, 204, 206, and 208 are read or written by a transducer or "head" (not shown) disposed over each surface. Data is recorded on concentric tracks 250 disposed on each surface. The position of a particular track 250 on a surface is referenced by a track number which is numbered according to its radial position on the disk surface. Since tracks on multiple surfaces are located at the same relative position, the term "cylinder" is often used to reference the same relative track location on all surfaces. Those skilled in the art will know that at times the term "cylinder" may be used synonymously with "track" to designate a particular radial address on a surface.

Within this specification the term "logical" is used as a modifier for many aspects of how data is disposed on the disk. For example a "logical" track, a "logical" head or surface, or a "logical" sector. The meaning of "logical" in these examples is that an arbitrary reference is made to a physical element, allowing addressing sequences to be independent of physical instances. This is accomplished through a process of conversion between physical and logical addressing. As an example, a track may have 40 consecutive data sectors numbered from 1 to 40. If one of the sectors, say sector 25, is defective, it is useful to eliminate it from consideration. The track can then be treated as a 39 sector track with physical sectors 1–24 being addressed as logical sectors 1–24, while physical sectors 26–40 would be addressed as logical sectors 25–39. Similarly the surfaces or heads of a disk may be arbitrarily sequenced and addressed through physical/logical conversions.

Conventionally, disk drive 100 receives data from a host computer (not shown). The data is conventionally subdivided into "logical blocks," each of which contains multiple data elements and is referenced by a "Logical Block Address" (LBA). In the prior art disk drive of FIG. 1 for example, a large amount of contiguous data may be written, in LBA order, first to fill a track 250a. Then at 310 a "head switch" is performed to continue writing to track 250b. When track 250b is filled, at 315 another head switch occurs and data continues to be written to track 250c. When track 250c is filled, at 320 another head switch is performed and data is written to track 250d. At this point, all tracks at the same cylinder position would be filled and a seek operation is necessary to continue writing. The set of tracks 250a, 250b, 250c, and 250d are known as a "cluster" and could be termed a "vertical cluster" 330 indicating their relative location in the disk drive. Since only a single cylinder position is used, the vertical cluster 330 is effectively uni-dimensional, that is its size only varies with the number of surfaces provided in the drive.

When the cluster is filled, the writing of sequential data blocks continues by conducting a seek operation at 325 to the next cylinder location and track 250e receives the data. In the example shown, both a seek and a head switch are performed at 325, although data could be written to an adjacent track instead and the process reversed to fill the cluster.

The above described procedure provides an efficient data transfer when the delay of a head switch is significantly shorter than a single track seek. As shown, 3 head switches occurred at 310, 315, and 320 to fill the cluster. If a single track seek required 3 ms and a head switch required 1 ms, then writing four consecutive tracks would only require 3 ms (three head switches) for the vertical cluster, while writing four adjacent tracks on the same surface would require three seek delays or 9 ms in addition to any rotational latency and the time to write an entire track.

Figure 2:
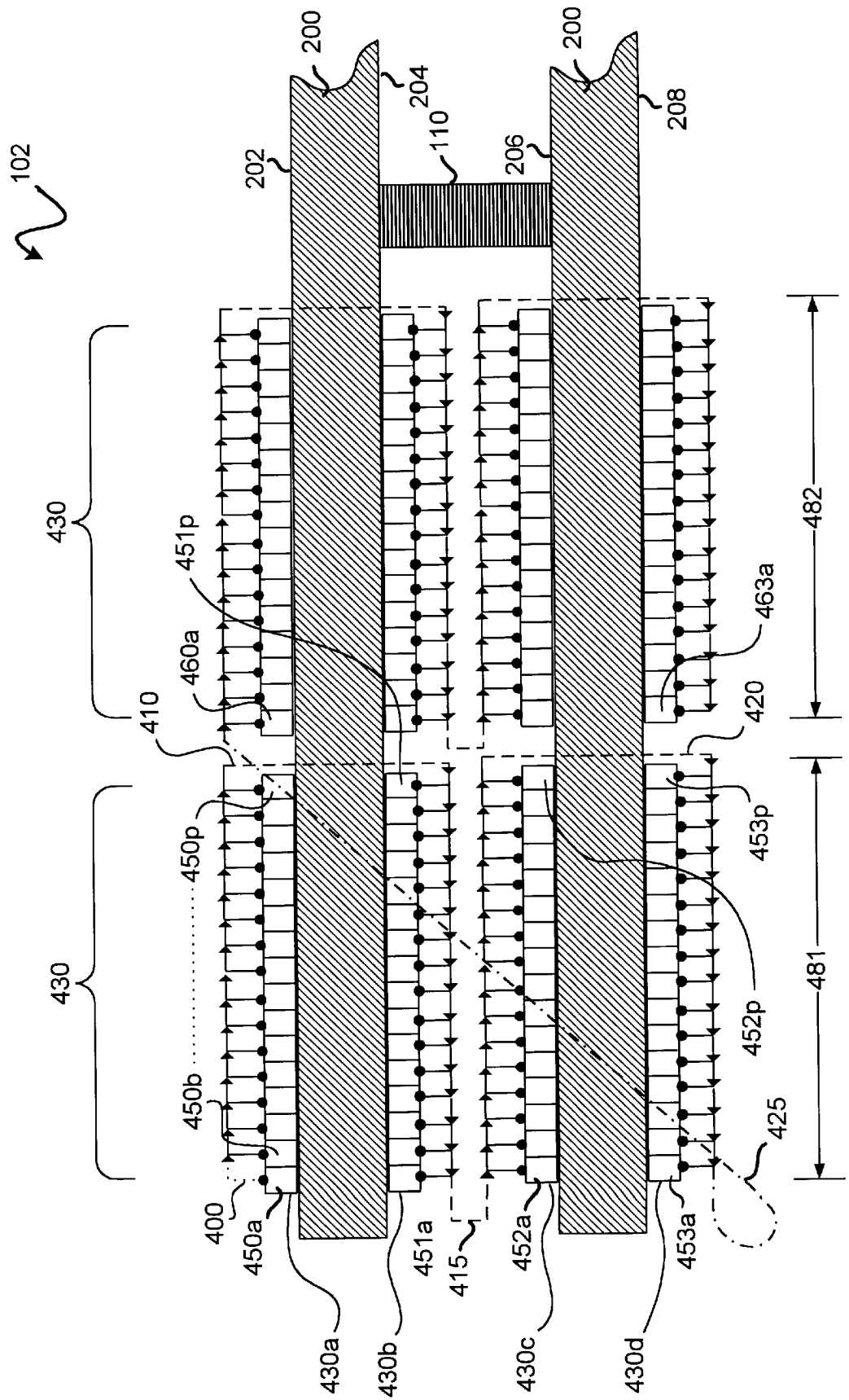
FIG. 2 shows a cross sectional view of a portion of a disk drive 102 using the invention to map sequential data blocks to multi-dimensional clusters comprising logical surface clusters.

FIG. 2 shows a disk drive 102 of the present invention. Although similar in physical structure to prior art disk drive 100, logical blocks are written or "mapped" to the drive in a markedly different arrangement. Because the traditional ratio of single track seek delays to head switch delays has in effect reversed due to current disk drive technology, for disk drive 102 a cluster is defined as a group of adjacent tracks disposed on any of a plurality of disks and may be termed a "multi-dimensional cluster" 430. The multi-dimensional cluster varies in both horizontal (number of cylinders) and vertical (number of surfaces) extents. A multi-dimensional cluster component on a particular surface may be termed a "logical surface cluster." One multi-dimensional cluster 430 comprises logical surface clusters 430a, 430b, 430c, and 430d. Logical surface cluster 430a further comprises tracks 450a–450p on surface 202. Similarly logical surface cluster 430b comprises tracks 451a–451p on surface 204, logical surface cluster 430c comprises tracks 452a–452p on surface 206, and logical surface cluster 430d comprises tracks 453a–453p on surface 208. The actual number of tracks or cylinders in a multi-dimensional cluster is determined empirically during design of the disk drive in order to optimize performance. More information will be provided below to illustrate the process of optimizing the number of cylinders per cluster.

For the case of writing a large amount of sequential data to disk drive 102, first track 450a is filled. Then at 400 a single track seek is performed to the next track of the cluster i.e. 450b. As each track is filled, a seek is performed to the next track, indicated by the arrows, until the last track of the cluster 450p is filled. At 410 a head switch selects track 451p and writing continues. When 451p is filled, a single track seek is performed in the opposite direction from those performed during the writing of the first cluster. The next track is filled, and writing and seeking continues until track 451 a is filled. At 415, a head switch occurs to select track 452a and the process continues as for the first two clusters with a head switch at 420 after filling track 452p to filling track 453p, seeking in single track increments, and then through the filling of track 453a. It may be seen from this process that the heads will be sweeping back and forth over a limited area defined by the size of (number of tracks in) the multi-dimensional cluster 430 in what might be termed a "serpentine" manner.

Disk drive 102 may have many multi-dimensional clusters 430. After the first multi-dimensional cluster 430 is filled by writing to all logical surface clusters at that position, a combination seek and head switch is preferably performed at 425 to continue writing sequential data at track 460a in a second multi-dimensional cluster 430. Alternatively, writing could continue at track 463 a which would postpone the head switch but require a reversal of the ordering between tracks and logical surface clusters from the first multi-dimensional cluster.

In order to optimize the disk area available for data storage, disks 200 are conventionally partitioned into "zones" which allows for the frequency at which data is recorded to vary at predefined radial positions across the disk surface. This allows available storage to be optimized rather than constraining data frequencies to what can be accommodated in the inner tracks. In a simple example, zones 481 and 482 are indicated in FIG. 2. Preferably, an integer number of logical surface clusters is contained within a zone to simplify data management using the invention.

Figure 3B:
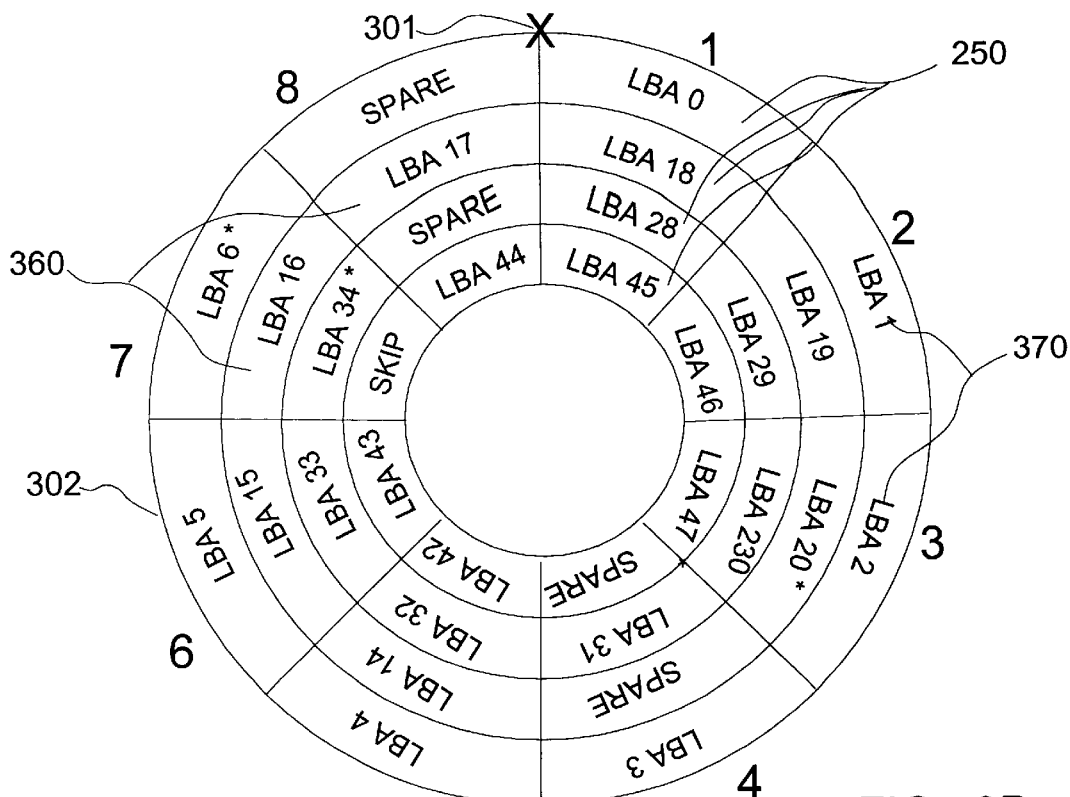
FIG. 3 shows logical data blocks mapped to two surfaces of a prior art disk drive and shows the "skewing" between adjacent tracks on the same surface and between tracks at the same cylinder position on different surfaces.
Figure 3A:
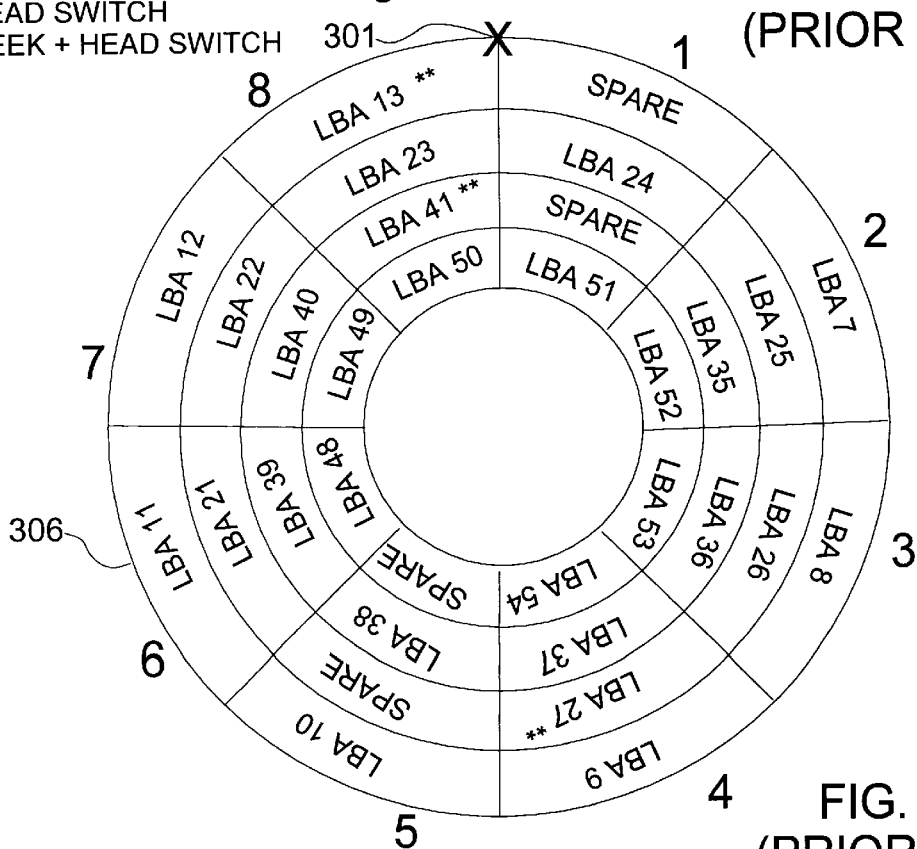

Now turning to FIG. 3, two disk surfaces, 302 and 306 respectively, of a prior art disk drive are shown to indicate the placement or mapping of logical blocks to data areas of the disks. For illustration simplicity, each surface is shown having four tracks 250 and each track 250 is divided into eight segments or sectors 360 which each can store a logical block 370 referenced by an LBA nn in each data sector where nn is the address of the block. A reference point or index 301 serves to mark an arbitrary circumferential point from which each sector can be located by its relative circumferential position on the track. Those skilled in the art will know that a practical disk has many more tracks and sectors and that a typical disk surface 302,306 has regularly spaced "servo sectors" interspersed between data sectors to provide a sampled signal servo system one of which may serve as an index.

Starting with surface 302, logical blocks 0–6 (LBA0–6) are written on a first track 250 of the surface in sectors 1–7.

The eighth sector on the track is previously designated as a spare. Conventionally, spare sectors may allocated on a track to allow for re-ordering the data blocks on the track in the event of a defect occurring during or after manufacturing. Following the convention of a vertical cluster, a head switch is performed after writing LBA 6, indicated by the asterisk, and the next sequential block LBA 7 is written on a first track of surface 306. Note that although LBA 6 is written in sector 7 of the first track on surface 302, LBA 7 is written in sector 2 of the corresponding track on surface 306. The relative displacement or "head skew" from sector 7 to sector 2 provides a delay between LBA 6 and LBA 7 which allows the head switch to be completed and stabilized before the data is written. The remaining blocks on the track, LBA 8–LBA 13 are then written.

Following the writing of LBA 13, the first vertical cluster has been filled and a combined head switch and seek to an adjacent track, indicated by the double asterisk is performed. LBA 13 is written in sector 8 of the first track on surface 306. LBA 14 is written on a second track of surface 302, but in sector 5. The skew between sector 8 and sector 5 is greater than that for a head switch due to the aforementioned prior art ratio where a single track seek takes longer than a head switch. The skew applied between tracks is termed "track skew." The writing of sequential data blocks continues as described above with each track of a vertical cluster being filled with sequential data, and then performing a seek and head switch to the next vertical cluster. The sequential writing process for each vertical cluster may be thought of as a series of track filling operations interspersed with head switches and no intervening seeks. Seek operations occur only between vertical clusters. Subsequent reading operations of sequential data will read vertical clusters in a similar manner.

Of note in FIG. 3 is sector 7 on the innermost track 250 of surface 302. The sector is marked as a "SKIP" or defective sector. A sector is so indicated when the disk drive is unable to dependably write correctable data in the sector. The consequence is that LBA 44 and subsequent blocks are written one sector later on the track and the skipped sector is not used.

Figure 4B:
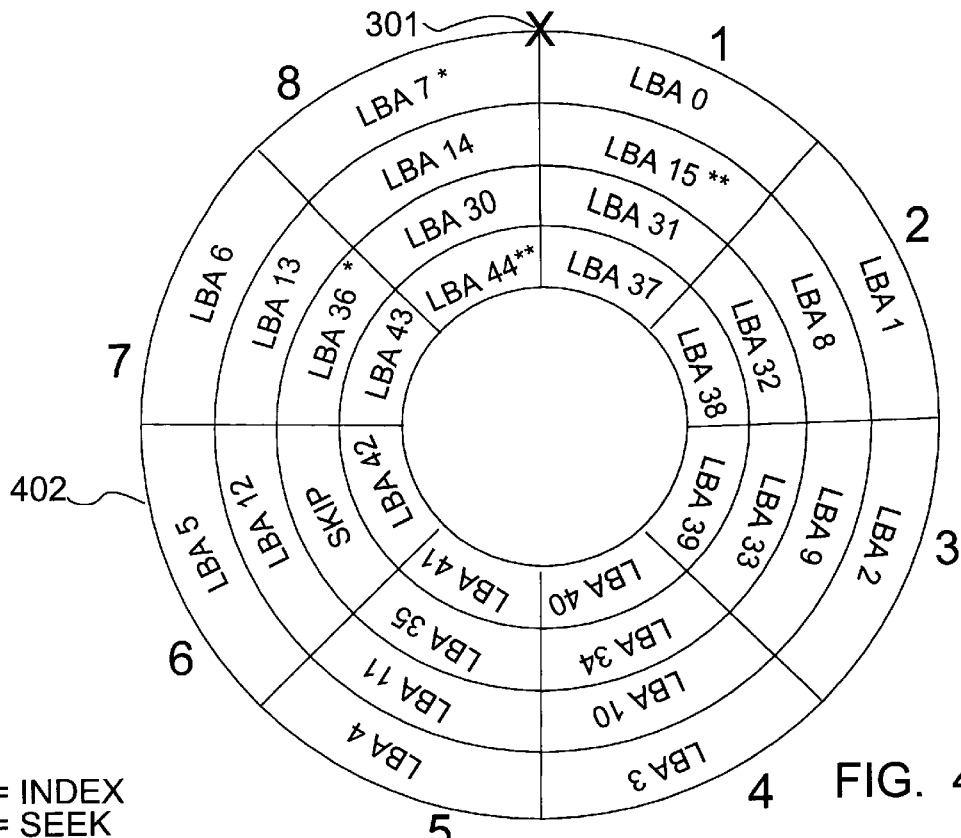
FIG. 4 shows logical data blocks mapped to two surfaces of a disk drive using the invention and shows the "skewing" between adjacent tracks on the same surface, between tracks at the same cylinder position on different surfaces, and between logical surface clusters.
Figure 4A:
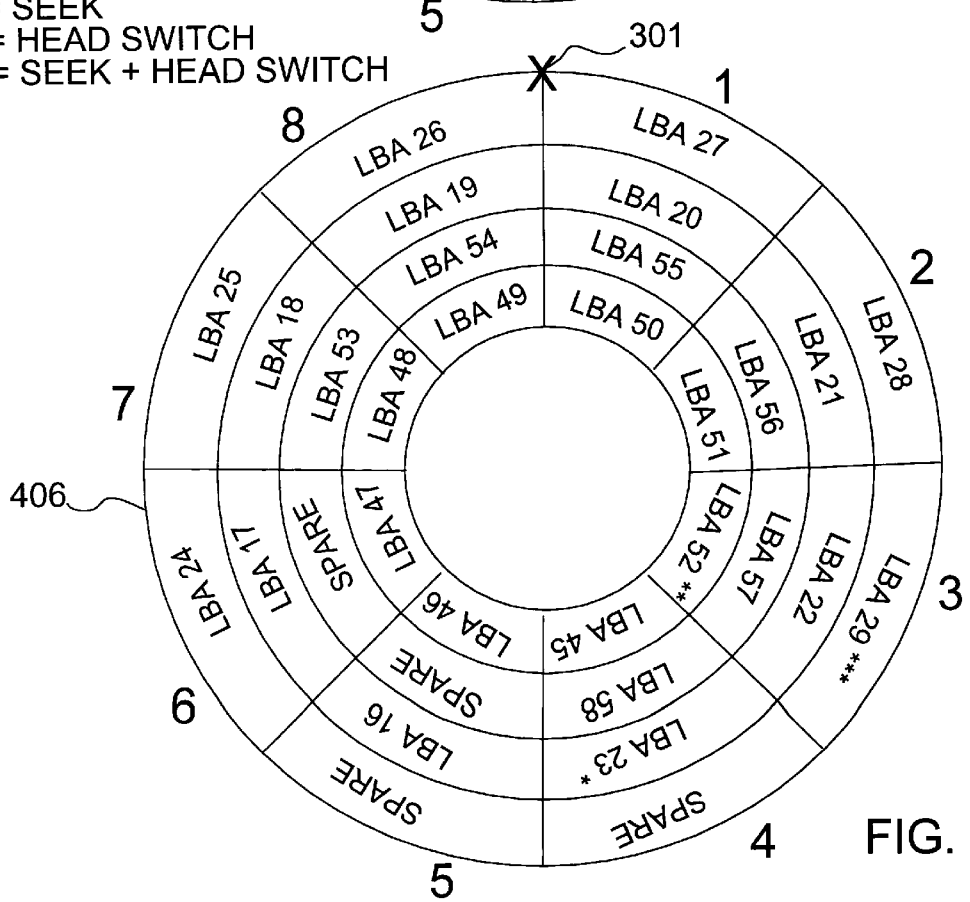

Now turning to FIG. 4, two disk surfaces 402, 406 of a disk drive using the invention are shown with the consequent mapping of logical blocks. The outermost track of surface 402 is filled by writing LBA 0 through LBA 7 in sectors 1–8. Then, as indicated by the asterisk, a seek is performed to the next innermost track. Writing continues at sector 2, providing a delay or track skew of one wedge to allow the seek to complete before the next sector is written or subsequently read. When LBA 15 is written in sector 1 filling the track, a head switch indicated by the double asterisk is performed to allow writing to continue on the corresponding track of surface 406. In this instance a head skew delay positions the next sequential block LBA 16 at sector 5 of the track, allowing time for the head switch to complete before continuing.

Writing proceeds with filling out the remainder of the track and at sector 4 LBA 23 is written and a seek is performed back to the outermost track in the above-mentioned serpentine motion. Again a track skew delay positions LBA 24 at sector 6. Writing continues to fill the track until LBA 29 at sector 3 is written. For this illustration the multi-dimensional cluster size is two cylinders, therefore after LBA 29 is written a combined seek and head switch skew or what might be termed a "cluster skew" is provided to allow writing to continue at the next multidimensional cluster which comprises the two innermost cylinders of surfaces 402 and 406. LBA 30 is then written at sector 8 of surface 402 allowing for the cluster skew.

Another aspect of the invention resides in the placement of spare sectors. In prior art disk drives using a vertical cluster, spare sectors were conventionally placed at the end of each track or possibly at the last track of a vertical cluster in order to allow the blocks to be "pushed down" along vertical cluster boundaries when a defective sector was encountered. With the mapping of the invention, spare sectors are preferably placed at the end of a multi-dimensional cluster to allow blocks to be pushed down within the multi-dimensional cluster boundaries. Note for example sectors 4 and 5 of surface 406 which follow the last block LBA 29 of the first multi-dimensional cluster shown in FIG. 4. These sectors are designated as spares, allowing a linear rearrangement or pushing down of blocks within the cluster. This arrangement maintains the sequence of data blocks in the event of a defective sector while desirably limiting the number of blocks to be rearranged. An extension of this process would be to provide spare tracks in each multi-dimensional cluster so that, in the event of an extended defective area, an entire track could be marked as defective and subsequent tracks could be pushed down to maintain sequentiality.

FIG. 8 shows, in tabular form, the mapping plan of a portion of a disk drive using the invention having five cylinders in each multi-dimensional cluster. The leftmost column is the logical multi-dimensional cluster number e.g. 0 or 1. The next column designates a partition number which provides for arbitrarily designating a set of logical surface clusters. The partition is not required in order to use the invention but provides for certain efficiencies in firmware handling of data on the disk. The next column designates the logical head number, corresponding to a disk surface. The next column designates the cylinder address for a given logical surface cluster. The next ten columns designate the physical sectors on each cylinder (10 per track in this example) and the assignment of logical sectors to physical sectors where corresponding logical data blocks are stored.

The first multi-dimensional cluster comprises partitions 0 and 1. Within partition 0 are two logical surface clusters, one of which is highlighted by heavily bordered element 801. At logical head 0 cylinders 4–8 contain the sequence of logical sectors from 0 to 49. Logical head 1 cylinders 8–4 contain logical sectors from 50–96. Note that spare sectors denoted by "S" are placed at the end of a pair of logical surface clusters. A second multi-dimensional cluster (cluster 1) is partially shown in FIG. 8, with partition 2 and logical surface clusters outlined by heavy borders.

The mapping table of FIG. 8 represents an "ideal" disk drive in which all the sectors are capable of storing recoverable data. Realistically, media imperfections cause some sectors to be unusable. A more practical mapping approach is illustrated in FIG. 9 where unusable areas of the disk surface including both sectors and entire tracks are accommodated. In FIG. 9 physical sectors which are unusable are marked with a "D" such as sector 1 on cylinder 6 and logical head 0. Note in this case that the defective sector following logical sector 20 is skipped, and the sequence of logical sectors continues at physical sector 2 of cylinder 6. Other instances of defective sectors are indicated in the table.

In certain circumstances, a "scratch" may develop on a track such that the entire track is unusable. Such an example is cylinder 6 of logical head 1 in FIG. 9, where the "X" in each sector indicates that the entire track is "mapped out." In this case, the track is skipped and the logical sector sequence continues on the next track as shown by the sequence from logical sector 67 on track 7 continuing at logical sector 68 on track 5, track 6 being skipped.

Commonly, a disk drive is required to provide information on defective sectors (defects) to a host computer. Because host computer programs may wish to monitor the ongoing quality of a disk drive, defects are frequently classified between those which were detected during production of the drive and those which were discovered during operation of the drive, the latter sometimes referred to as "grown" defects. The combined list of defects is known as the Plist/Glist indicating Production and Grown defects. In conventional disk drives, the list is ordered in a sequence corresponding to conventional mapping where the order of defect occurrence corresponds to the progression of cylinder/head order as shown in FIGS. 1 and 3. For a disk drive using the invention it is beneficial to order the Plist/Glist according to order of occurrence in the previously discussed "serpentine" order of logical surface clusters.

To illustrate a method for ordering defects in this manner, a simplified track layout using the invention is shown in the table of FIG. 11. Defective sectors are indicated by bold italic numbers. Two multi-dimensional clusters 0 and 1 are shown where multi-dimensional cluster 0 comprises cylinders 4–8 as listed under the column heading "CYL" and heads (surfaces) 0–3. Multi-dimensional cluster 1 comprises cylinders 9–13 and heads 0–3. The next four columns list sectors in serpentine order by logical head number. The corresponding physical head for each logical head is shown in parentheses. Defective sectors are represented in the table by bold, italic characters. The serpentine progression simply follows the sector number order in the table.

A first step in providing a defect list in serpentine order is shown in FIG. 12 where the ten defective sectors from FIG. 11 are indexed in a table sorted in order of ascending cylinder numbers. The "CYL" column indicates the cylinder number, the "PHYS HD" column lists the physical head number, and the "LOG HD" column lists the corresponding logical head. The defects in this table are listed in the order in which they would occur in scanning by ascending cylinder numbers without regard to serpentine order. For example, looking back at the table in FIG. 11, the first cylinder exhibiting a defective sector (sector 8) is cylinder 5 under logical head 1/physical head 2.

The next step would be to re-order the defects taking into account the boundaries of logical surface clusters. This is shown in FIG. 13 where the first defect (sector 2) would occur in the first logical surface cluster at cylinder 6 under logical head 0/physical head 0. The next defect (sector 8) would occur in the next logical surface cluster at cylinder 5 under logical head 1/physical head 2 and so on.

The final step would be to account for the serpentine progression of sequencing through ascending and descending cylinder numbers on alternating logical surface clusters. This is shown in FIG. 14 where the order is reversed for odd numbered logical heads.

Figure 5:
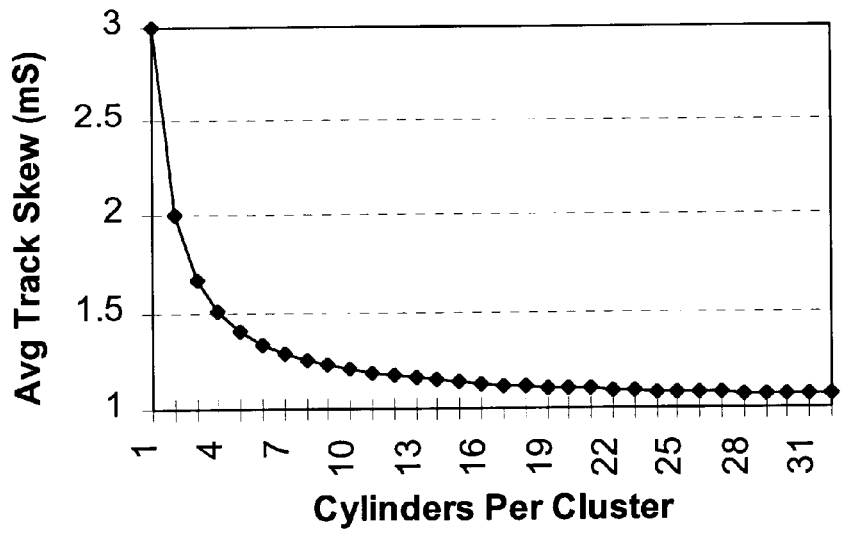
FIG. 5 is a chart showing the effect on average track skew of increasing the number of cylinders in a logical surface cluster in disk drive having 12 heads.

As indicated above, the process of determining an optimum design point for the number of cylinders in a multi-dimensional cluster is, to some extent, experimental. A first approximation can be made by measuring or simulating the time required to perform a single track seek, the time required for a range of multiple track seeks, the time required to perform a head switch, and the data transfer rate expected. With these values and a design target for the number of heads, a spreadsheet can be constructed to provide a graphical representation. Such a graph is shown in FIG. 5 where average track skew (seek delays averaged over 12 heads) is plotted versus cylinders per cluster for a twelve head disk drive. The curve shows a diminishing return of improvement in delay as the cylinders per cluster approach 10. This would serve to indicate a first order approximation of 10 cylinders per cluster.

Figure 6:
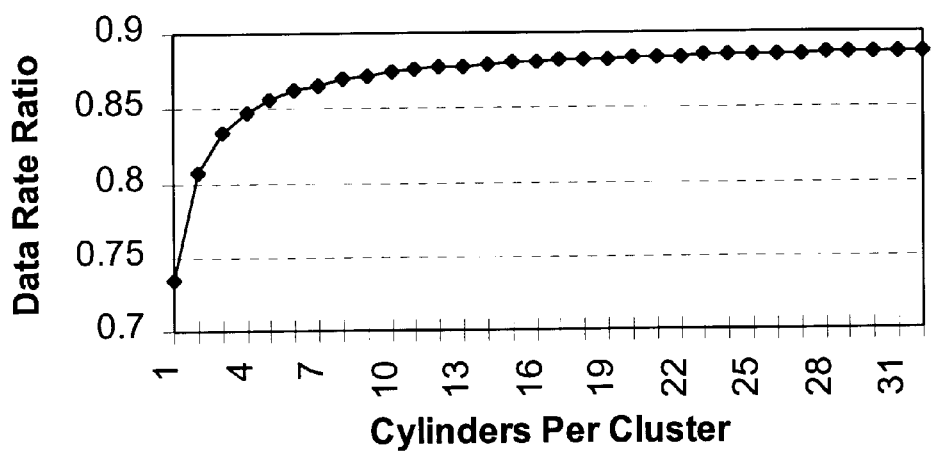
FIG. 6 is a chart showing the effect on average data rate in the 12 head disk drive of increasing the number of cylinders in a logical surface cluster.

Another view of the effect of increasing cylinders per cluster is shown in the graph of FIG. 6, where the Average data transfer rate is plotted against cylinders per cluster for the same disk drive. Again an improvement in data rate tends to "flatten out" at around 10 cylinders per cluster.

Figure 7:
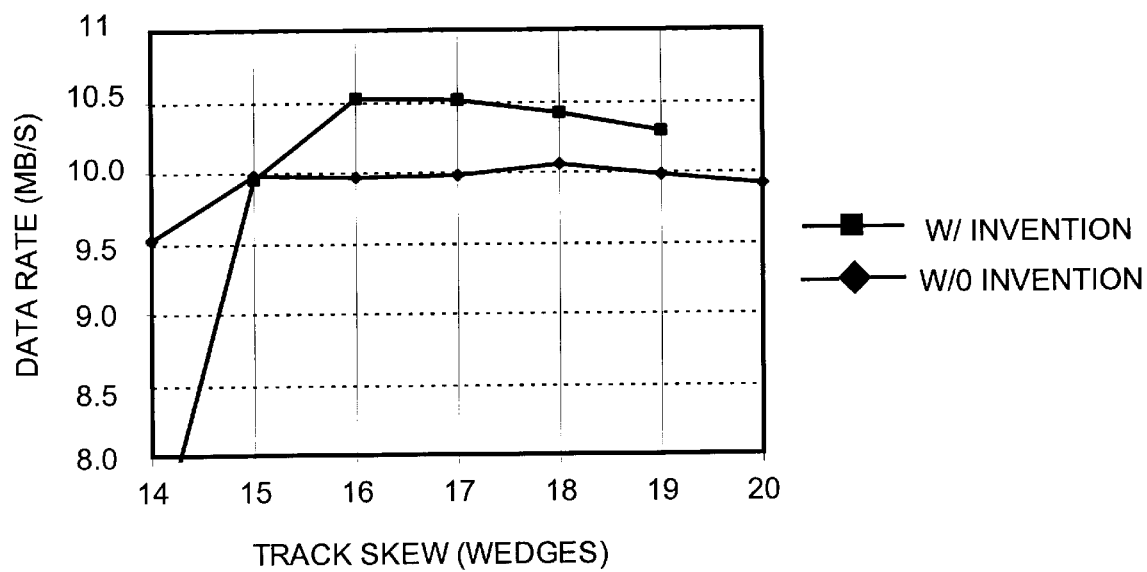
FIG. 7 is a chart showing the effect on data rate when varying the skew between tracks with and without the invention.

When a design point is established for the number of cylinders per cluster, it is necessary to determine a target for track skew since single cylinder seeks will dominate when performing sequential operations using the invention. FIG. 7 shows a graph of experimentally derived data which plots data transfer rate versus track skew expressed in "wedges" for a disk drive formatted with and without the invention. As the graph indicates, the overall data rate is improved by using serpentine mapping with an appropriate track skew. In the example shown, an optimum skew of 16 wedges provides the highest data rate.

Figure 10:
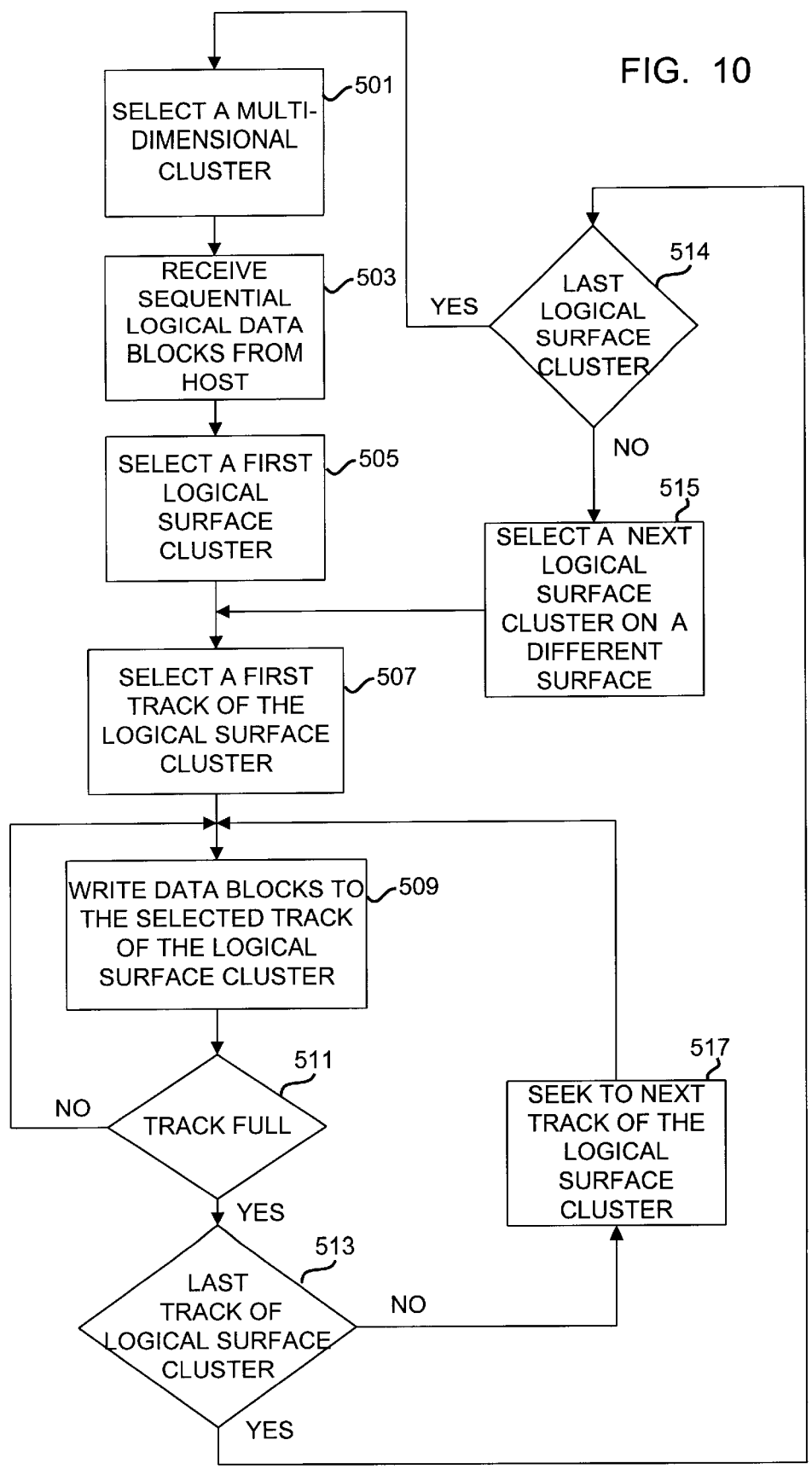
FIG. 10 is a flow chart showing the method of the invention to map logical blocks to a plurality of logical surface clusters.

The method of the invention to map sequential logical data blocks to a plurality of disk surfaces can be summarized in the flow chart of FIG. 10. At step 501 a multi-dimensional cluster of predefined size is selected for the ensuing data transfer. At step 503 the disk drive receives sequential data blocks from a host computer. At step 505, a first logical surface cluster is selected. At step 507, a first track of the selected logical surface cluster is selected. At step 509, logical data blocks are written to the selected track until it is full at step 511. A test is made at 513 to determine if the last track of the logical surface cluster has been written. If not, at 517 a seek to the next track of the logical surface cluster is performed and writing continues at 509. If the last track of the logical surface cluster has been written at 513, then at 514 a test is made to determine if the last logical surface cluster of the selected multi-dimensional cluster has been written. If so, another multi-dimensional cluster may be selected at 501 and the process continues. If the last logical surface cluster is not reached at 514, then the next sequential logical surface cluster on a different surface is selected and the process repeats. Preferably the sequencing of track selection alternates between successive logical surface clusters so that, for example, on even numbered logical surface clusters the track numbers increment, while on odd logical surface clusters the track numbers decrement. This provides for the desired "serpentine" progression.

We claim:

1. A method of operating a disk drive having a controllable head stack assembly including a plurality of heads and having a plurality of disk surfaces, each disk surface having a total number of tracks, the method causing an optimized transfer of a sequence of logical data blocks between the tracks and the heads, the method comprising:

a) a multiple step operation to cause the head stack assembly to perform a sequence of alternating a plurality of track seeks and head switches in which each head switch is preceded by an optimized number of track seeks on a single disk surface so that one head at a time defines a respective part of a serpentine accessing path defined over a selected group of the tracks on said single disk surface, said optimized number of track seeks being a submultiple of said total number of tracks on said single disk surface, said submultiple being empirically selected given a fixed time to perform a single track seek, a fixed time required for multiple track seeks, a fixed time required for head seeks and said data transfer rate; and b) transferring the logical data blocks between the heads and the selected group of tracks during the multiple step operation.

2. A method of mapping sequential logical data blocks to a plurality of disk surfaces, each having a total number of adjacent tracks, the method comprising a) selecting a multi-dimensional cluster having horizontal and vertical extents and comprising a plurality of logical surface clusters, each logical surface cluster comprising an optimized number of a plurality of adjacent tracks on a respective one of the plurality of disk surfaces;

b) selecting a first one of the plurality of logical surface clusters;

c) writing sequential logical data blocks to each track of the selected first one of the plurality of logical surface clusters;

d) selecting a second one of the plurality of logical surface clusters;

e) writing sequential logical data blocks to each track of the selected second one of the plurality of logical surface clusters, the sequential logical data blocks written to the second logical surface cluster being contiguous with the sequential logical data blocks written to the first logical surface cluster wherein said optimized number of said plurality of adjacent tracks is a submultiple of said total number of tracks on said single disk surface, said submultiple being empirically selected given a fixed time to perform a single track seek, a fixed time required for multiple track seeks, a fixed time required for head seeks and said data transfer rate.

3. The method of claim 2 wherein each track is assigned a cylinder number corresponding to a cylinder position and the plurality of tracks is arranged by cylinder number order.

4. The method of claim 3 wherein the sequential logical data blocks are written to the first logical surface cluster by cylinder number order.

5. The method of claim 4 wherein the cylinder number order is ascending.

6. The method of claim 5 wherein the cylinder number order is descending.

7. The method of claim 3 wherein the sequential logical data blocks are written to the second logical surface cluster by cylinder number order.

8. The method of claim 7 wherein the cylinder number order is descending.

9. The method of claim 7 wherein the cylinder number order is ascending.

10. The method of claim 3 wherein the sequential logical data blocks written to the second logical surface cluster begin writing at the same cylinder position as the last cylinder position written to the first logical surface cluster.

11. The method of claim 2 wherein each of the plurality of surfaces is partitioned into a plurality of zones and wherein each zone contains data written at different frequencies than other zones on a respective one of the plurality of surfaces.

12. The method of claim 11 wherein the number of logical surface clusters in each zone is an integer.

13. A disk drive having a controllable head stack assembly including a plurality of heads and having a plurality of disk surfaces, each disk surface having a total number of tracks, and means for:

a) causing the transfer of a sequence of logical data blocks between the tracks and heads;

b) a multiple step operation to cause the head stack assembly to perform a sequence of alternating a plurality of track seeks and head switches in which each head switch is preceded by an optimized number of track seeks so that one head at a time defines a respective part of a serpentine accessing path defined over a selected group of the tracks, said optimized number of track seeks being a submultiple of said total number of tracks on said single disk surface, said submultiple being empirically selected given a fixed time to perform a single track seek, a fixed time required for multiple track seeks, a fixed time required for head seeks and said data transfer rate; and c) transferring the logical data blocks between the heads and the selected group of tracks during the multiple step operation.

* * * * *